United States Patent
Ma

(10) Patent No.: US 6,253,173 B1
(45) Date of Patent: *Jun. 26, 2001

(54) SPLIT-VECTOR QUANTIZATION FOR SPEECH SIGNAL INVOLVING OUT-OF-SEQUENCE REGROUPING OF SUB-VECTORS

(75) Inventor: Hung Shun Ma, Beaconsfield (CA)

(73) Assignee: Nortel Networks Corporation, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/954,469

(22) Filed: Oct. 20, 1997

(51) Int. Cl.[7] .............................. G10L 19/00; G10L 15/06

(52) U.S. Cl. ........................................... 704/222; 704/243

(58) Field of Search ..................................... 704/222, 243

(56) References Cited

U.S. PATENT DOCUMENTS

| 4,164,025 | 8/1979 | Dubnowski et al. ................. 707/533 |
|---|---|---|
| 4,751,736 | 6/1988 | Gupta et al. ........................... 704/230 |
| 4,751,737 | 6/1988 | Gerson et al. ......................... 704/243 |
| 4,797,910 | 1/1989 | Daudelin ............................ 379/88.01 |
| 4,956,865 | 9/1990 | Lennig et al. ........................ 704/241 |
| 4,959,855 | 9/1990 | Daudelin .............................. 379/213 |
| 4,979,206 | 12/1990 | Padden et al. ..................... 379/88.01 |
| 5,050,215 | 9/1991 | Nishimura ............................. 704/256 |
| 5,052,038 | 9/1991 | Shepard ............................. 379/88.09 |
| 5,086,479 | 2/1992 | Takenaga et al. .................... 382/157 |
| 5,091,947 | 2/1992 | Ariyoshi et al. ...................... 704/246 |
| 5,097,509 | 3/1992 | Lennig ................................. 704/240 |
| 5,127,055 | 6/1992 | Larkey ................................. 704/244 |

(List continued on next page.)

OTHER PUBLICATIONS

Kuldip K. Paliwal and Bishnu S. Atal, "Efficient Vector Quantization of LPC Parametaers at 24 Bits/Frame", IEEE Trans. on Speech and Audio Processing, vol. 1, No. 1, pp. 3–14, Jan. 1993.*

*Fundamentals of Speech Recognition*, L. Rabiner et al., Prentice Hall, 1993, pp. 122–132.

*Dynamic Adaptation of Hidden Markov Model for Robust Speech Recognition*, IEEE International Symposium on Circuits and Systems, vol. 2, May, 1989, pp. 1336–1339.

*Large Vocabulary Continuous Speech Recognition: A Review*, IEEE Automatic Speech Recognition Workshop, Sep., 1995, pp. 3–28.

*Putting Speech Recognition to Work in the Telephone Network*, Computer, IEEE Computer Society, vol. 23, No. 8, Aug. 1990, pp. 35–41.

An Introduction to Hidden Markov Models, L.R. Rabiner et al., IEEE ASSP Magazine, Jan., 1986, pp. 4–16.

A Fast Search Strategy in a Large Vocabulary Word Recogniser, V.N. Gupta et al., INRS–Telecommunications, J. Acoust. Soc. Am. 84 (6), Dec. 1988.

(List continued on next page.)

Primary Examiner—Tālivaldis I. Šmits

(57) ABSTRACT

A method and apparatus for compressing and decompressing an audio signal. The apparatus comprises an input for receiving an audio signal derived from a spoken utterance, the audio signal being contained into a plurality of successive data frames. A data frame holding a certain portion the audio signal is processed to generate a feature vector including a plurality of discrete elements characterizing at least in part the portion of the audio signal encompassed by the frame, the elements being organized in a certain sequence. The apparatus makes use of a compressor unit having a grouping processor for grouping elements of the feature vector into a plurality of sub-vectors on the basis of a certain grouping scheme, at least one of the sub-vectors including a plurality of elements from the feature vector, the plurality of elements being out of sequence relative to the certain sequence. The plurality of sub-vectors are then quantized by applying a vector quantization method.

26 Claims, 10 Drawing Sheets

U.S. PATENT DOCUMENTS

| | | | |
|---|---|---|---|
| 5,163,083 | | 11/1992 | Dowden et al. ................... 379/88.03 |
| 5,165,095 | * | 11/1992 | Borcherding ...................... 379/88.03 |
| 5,181,237 | | 1/1993 | Dowden et al. ................... 379/88.03 |
| 5,204,894 | | 4/1993 | Darden .............................. 379/88.03 |
| 5,226,044 | | 7/1993 | Gupta et al. .......................... 370/435 |
| 5,272,528 | * | 12/1993 | Juri et al. ............................. 348/403 |
| 5,274,695 | | 12/1993 | Green ................................. 379/88.02 |
| 5,307,444 | | 4/1994 | Tsuboka ................................ 706/20 |
| 5,390,278 | | 2/1995 | Gupta et al. .......................... 704/243 |
| 5,488,652 | | 1/1996 | Bielby et al. ..................... 379/88.03 |
| 5,495,555 | * | 2/1996 | Swaminathan ...................... 704/207 |
| 5,515,475 | | 5/1996 | Gupta et al. .......................... 704/242 |
| 5,596,676 | * | 1/1997 | Swaminathan et al. ............ 704/208 |
| 5,649,051 | * | 7/1997 | Rothweiler et al. ................. 704/222 |
| 5,651,026 | * | 7/1997 | Lin et al. ............................... 375/240 |
| 5,651,090 | * | 7/1997 | Moriya et al. ....................... 704/222 |
| 5,664,058 | * | 9/1997 | Vysotsky .............................. 704/243 |
| 5,668,925 | * | 9/1997 | Rothweiler et al. ................. 704/220 |

OTHER PUBLICATIONS

*A Tutorial on Hidden Markov Models and Selected Applications in Speech Recognition*, Lawrence R. Rabiner, Fellow, IEEE, vol. 77, No. 2, Feb. 1989, pp. 257–286.

*A Modified K–Means Clustering Algorithm for Use in Isolated Work Recognition*, Jay Wilpon and Lawrence R. Rabiner, IEEE, vol. ASSP–33, No. 3, Jun. 1985, pp. 587–594.

Unleashing the Potential of Human–to–Machine Communication, Labov and Lennig, Telesis, Issue 97, 1993, pp. 23–27.

*Application of Clustering Techniqes to Speaker–Trained Isolated Work Recognition*, L.R. Rabiner et al., The Bell System Technical Journal, Dec. 1979, pp. 2217–2233.

*Comparison of Parametric Representation for Monosyllabic Work Recognition in Continuously Spoken Sentences*, S. Davis and P. Mermelstein, IEEE Trans. ASSP, ASSP–28, 1980, pp. 357–366.

*A Pyramic Image Coder Using Classified Transform Vector Quantization*, Park et al., Signal Processing, vol. 22, Elsevier Science Publishers B.V., 1991, pp. 25–42.

*Efficient Vector Quantization of LPC Parameters at 24 Bits/Frame*, Paliwal et al., IEEE Transactions on Speech and Audio Processing, vol. 1, No. 1, 1993, pp. 3–14.

*Optimal Quantization of LSP Parameters*, Soong et al., IEEE Transactions on Speech and Audio Processing, vol. 1, No. 1, 1993, pp. 14–24.

*Variable–Rate Finite–state Vector Quantization and Applications to Speech and Image Coding*, Hussain et al., IEEE Transactions on Speech and Audio Processing, vol. 1, No. 1, 1993, pp. 14–24.

*Efficient Search and Design Procedures for Robust Multi–Stage VQ of LPC Parameters of 4 kb/s Speech Coding*, W.P. LeBlanc et al., IEEE Transactions on Speech and Audio Processing, vol. 1, No. 4, 1993, pp. 373–385.

*Codebook Design for Trellis Quantization Using Simulated Annealing*, Nassa et al., IEEE Transactions on Speech and Audio Processing, vol. 1, No. 4, 1993, pp. 400–404.

*A Classified Split Vector Quantization of LFS Parameters*, Dong–iI Chang et al., Signal Processing 59, Elsevier Science B.V., 1997, pp. 267–273.

* cited by examiner

SPLIT-VECTOR QUANTIZATION FOR SPEECH SIGNAL INVOLVING OUT-OF-SEQUENCE REGROUPING OF SUB-VECTORS

FIELD OF THE INVENTION

This invention relates to a method and an apparatus for automatically performing desired actions in response to spoken requests. It is applicable to speech recognition systems, specifically to speech recognition systems using feature vectors to represent speech utterances, and can be used to reduce the storage space required for the speech recognition dictionary and to speed-up the upload/download operation required in such systems.

BACKGROUND OF THE INVENTION

In addition to providing printed telephone directories, telephone companies provide information services to their subscribers The services may include stock quotes, directory assistance and many others. In most of these applications, when the information requested can be expressed as a number or number sequence, the user is required to enter his request via a touch tone telephone. This is often aggravating for the user since he is usually obliged to make repetitive entries in order to obtain a single answer. This situation becomes even more difficult when the input information is a word or phrase. In these situations, the involvement of a human operator may be required to complete the desired task.

Because telephone companies are likely to handle a very large number of calls per year, the associated labour costs are very significant Consequently, telephone companies and telephone equipment manufacturers have devoted considerable efforts to the development of systems which reduce the labour costs associated with providing information services on the telephone network These efforts comprise the development of sophisticated speech processing and recognition systems that can be used in the context of telephone networks.

In a typical speech recognition system the user enters his request using isolated word, connected word or continuous speech via a microphone or telephone set. The request may be a name, a city or any other type of information for which either a function is to be performed or information is to be supplied. If valid speech is detected, the speech recognition layer of the system is invoked in an attempt to recognize the unknown utterance. The speech recognition process can be split into two steps namely a pre-processing step and a search step The pre-processing step, also called the acoustic processor, performs the segmentation, the normalisation and the parameterisation of the input signal waveform. Its purpose is traditionally to transform the incoming utterance into a form that facilitates speech recognition. Typically feature vectors are generated at this step. Feature vectors are used to identify speech characteristics such as formant frequencies, fricative, silence, voicing and so on. Therefore, these feature vectors can b used to identify a spoken utterance The second step in the speech recognition process, the search step, includes a speech recognition dictionary that is scored in order to find possible matches to the spoken utterance based on the feature vectors generated in the pre-processing step. The search may be done in several steps in order to maximise the probability of obtaining the correct result in the shortest possible time and most preferably in real-time. Typically, in a first pass search, a fast match algorithm is used to select the top N orthographies from a speech recognition dictionary. In a second pass search the individual orthographies are re-scored using more precise likelihood calculations. The top two orthographies in the re-scored group are then processed by a rejection algorithm that evaluates if they are sufficiently distinctive from one another so that the top choice candidate can be considered to be a valid recognition.

Voiced activated dialling (VAD) systems are often based on speaker trained technology. This allows the user of the service to enter by voice a series of names for which he wishes to use VAD. Each of the names is associated with a phone number that is dialled when the user utters the name. The names and phone number are stored in a "client dictionary" situated in the central repository of the VAD system. Each subscriber of the service has an associated client dictionary. Since the number of subscribers is substantial and the number of entries in each client dictionary can be quite large, the storage requirements for the central repository are very high. Furthermore, each user request requires his respective client dictionary to be downloaded to a temporary storage location in the speech recognition unit, which puts a further load on the system. Compression/Decompression techniques are required to allow the system to support such a load. However prior art techniques that have high compression factors are either not real-time or degrade significantly the performance of the speech recogniser in terms of recognition accuracy of the speech recognition system Thus, there exists a need in the industry to provide a real-time compression/decompression method such as to minimize the storage requirement of a speech recognition dictionary while maintaining a high recognition accuracy

OBJECTS AND STATEMENT OF THE INVENTION

An object of the invention is to provide a method and apparatus for performing compression and/or decompression of an audio signal that offers real time performance, particularly well suited in the field of speech recognition.

Another object of this invention is to provide a method and apparatus for adding entries to a speech recognition client dictionary, particularly well suited for use in training a voice activated dialing system As embodied and broadly described herein the invention provides an apparatus for compressing an audio signal, said apparatus comprising:

means for receiving an audio signal;

means for processing said audio signal to generate at least one feature vector, said feature vector including a plurality of elements;

means for grouping elements of said feature vector into a plurality of sub-vectors; and means for quantizing said plurality of sub-vectors.

For the purpose of this specification the expressions "feature vector" is a data element that can be used to describe the characteristics of a frame of speech. The elements of the feature vectors are parameters describing different components of the speech signal such as formants, energy, voiced speech and so on. Examples of parameters are LPC parameters and mel-based cepstral coefficients.

For the purpose of this specification the expression "speech recognition client dictionary" designates a data structure containing orthographies that can be mapped onto a spoken utterance on the basis of acoustic characteristics and, optionally, a-priori probabilities or another rule, such as a linguistic or grammar model. Each of these data structures is associated to a user of a speech recognition system.

For the purpose of this specification, the expressions "orthography" is a data element that can be mapped onto a spoken utterance that can form a single word or a combination of words For the purpose of this specification, the epressions "quantizing", "quantize" and "quantization" are used to designate the process of approximating a value by another in order to reduce the memory space required in the representation of the latter. Devices designated herein as a "quantizor" perform this process.

In a most preferred embodiment of this invention the compression apparatus is integrated into a speech recognition system, such as a voice activated dialing system, of the type one could use in a telephone network, that enables users to add names to a directory in order to train the system. Preferably, each user has his directory, herein referred to as client dictionary, where he may enter a plurality of entries. In a typical training interaction, once the voice activated system receives a is request from the user, it will first download from a central database, herein referred to as database repository, the client dictionary associated with the user As a second step the system will issue a prompt over the telephone network requesting the user to specify a name he wishes add. If valid speech is detected the speech utterance is transformed into a series of feature vectors by a preprocessing module. Each feature vector describes the characteristics of one frame of speech. The preferred embodiment of this invention uses mel-based vectors each vector being composed of twenty-three (23) coefficients. The first eleven (11) elements of the feature vector, often referred to as the static parameters, are the cepstral coefficients $c_1, \ldots, c_{11}$. The remaining twelve (12) elements, often called dynamic parameters, are often designated as $\delta c_0, \ldots, \delta c_{11}$ and are estimated from the first derivative of each cepstral coefficient. In the preferred embodiment the cepstral coefficient $c_0$, which represents the total energy in a given frame, is not used. The feature vectors are then transferred to the speech recognition search unit The speech training unit of this module performs confusability testing between the newly entered utterance and each entry in the client dictionary. This confusability testing includes three parts. Firstly, each entry in the client dictionary is processed by the decompression unit which generates a series of feature vectors. In the preferred embodiment entries are processed one at the time. Each entry in the client dictionary is then scored for similarity against the new entry. The preferred embodiment of this invention uses the fast-match algorithm. Examples of fast match algorithms can be found is in Gupta V. N., Lennig M., Mermelstein P. "A fast search strategy in a large vocabulary word recogniser" INRS-Telecommunications. J. Acoust. SocP Am. 84 (6), December 1988, p.2007 and in U.S. Pat. No. 5,515,475 by inventors Gupta V. N. & Lennig M. The content of these documents is incorporated herein by reference. Once all the entries in the client dictionary have been scored, the best score is compared to a threshold indicating the minimum level for confusability. If the score exceeds this threshold, implying that there is an entry in the client dictionary very similar to the one being added, the system returns an error indicating the problem to the user. On the other hand if the score is below the threshold and no entry in the client dictionary is similar enough, the system requests the user to enter the same name a second time. Again the confusability test is performed with each entry in the client dictionary and the same threshold test is applied. This time, if the threshold is satisfied a second test, herein referred to as the consistency test, is performed between the first input utterance and the second input utterance. The preferred embodiment of this invention uses a Dynamic Time Warping (DTW) computation here to compute the distance between the two utterances If the comparison is successful, a model is created which is a combination of the two utterances again using DTW techniques to compute the distance between them. Dynamic Time Warping is well known in the field of speech processing. The reader is invited to consult speech recognition books such as "Discrete Time Processing of Speech Signals" by Deller & als. MacMillan publishing New York and O'Shawnessey D. (1990) "Speech Communication: Human and Machine", Addison-Wesley. Addison-Wesley series in Electrical Engineering: Digital Signal Processing, whose contents are hereby incorporated by reference. If the test is successful a model representing a Dynamic Time Warping average is created. Following this, the model is processed by the compressor module which generates a compressed version of the feature vector herein designated as a quantizor codebook entry index vector Once the quantizor codebook entry index vectors have been generated for the utterance, they are added to the client dictionary along with useful information such as a telephone number in the case of voice activated dialing. Once the user terminates his operation and hangs up, the client dictionary is uploaded to the database repository. The compression/decompression operations allow the system to reduce the storage space required for the quantizor codebook entry index vector since the quantizor codebook entry index vectors require less space than the feature vectors Furthermore, by virtue of their reduced size the processor overhead required to download and upload the client dictionary is reduced since less data must be transferred.

In the preferred embodiment of this invention the compressor module uses a two step vector quantization method. The basic approach of the compressor is to group the 23-dimensional cepstral vector into a number of pre-defined sub-vectors of various sizes and to encode them separately using a set of variable-bit quantizors which are optimized for these sub-vectors respectively. The feature vector coefficients are first grouped into sub-vectors by a grouping processor. The sub-vectors compositions are defined by a priori assignments stored in a grouping table. These a priori assignments are defined by off-line iterative computations in order to form groups that maximize the accuracy of the system. Secondly, each sub-vector is processed by a $N_k$-bit quantizor, Nk being the number of bits assigned to the kth sub-vector. The quantizors generate an index corresponding to an entry in the codebook and each sub-vector is assigned a certain number of bits to index entries in quantizor codebooks. These indices form the compressed version of the feature vector. In the preferred embodiment each quantizor is associated to a quantizor codebook. The codebooks are created off-line using vector quantization methods namely iterative clustering is performed on the entries the sub-vectors assigned to a particular codebook. Essentially clustering involves selecting the best set of M codebook vectors based on L test vectors (L≧M). The clustering procedure is well known in the field to which this invention pertains. More information about this topic can be found in "Fundamentals of speech Recognition" Prentice Hall publishing by L. Rabiner and B.-H. Guang (1993) p.122–132 whose content is hereby incorporated by reference.

In another preferred embodiment of this invention the speech recognition system is integrated into a voice activated dialing system, such as one that could be used in a telephone network, that enables users to dial a number simply by uttering the name of the entity he wishes to reach. Once the voice-activated system receives a request from the user, it will first issue a prompt over the telephone network requesting the user to specify the name of the user he wishes to call. If valid speech is detected the speech utterance is transformed into a series of feature vectors by a preprocessing module. Each feature vector describes the characteristics of one frame of speech. The preferred embodiment of this invention uses mel-based vectors each vector being composed of twenty-three (23) coefficients. The cepstral coefficient co is not used since it represents the total energy in a given frame. The feature vectors are then transferred to the speech recognition search unit. The speech recognition unit of this module performs a best match testing operation between the newly entered utterance and each entry in the client dictionary. This best match testing includes two parts. Firstly, each entry in the client dictionary is processed by the decompression unit which generates a series of feature vectors. In the preferred embodiment entries are processed one at the time. Each entry in the client dictionary is then scored for similarity against the new entry. The preferred embodiment of this invention uses a fast-match algorithm. Once all the entries in the client dictionary have been scored, the best score is compared to a threshold indicating the minimum level for a match. If the score exceeds this threshold, implying that there is an entry in the client dictionary very similar to the one being sought, the system returns the number associated with the best match. On the other hand if the score is below the threshold and no entry in the client dictionary is similar enough, the system returns an error or requests the user to enter the name a second time.

In the preferred embodiment of this invention the decompressor module uses a two step vector quantization method. The dictionary entries are stored in the form of quantizor codebook entry index vectors The quantizor codebook entry index vectors are used to lookup in the codebooks the associated quantized coefficients The codebooks are the same as those of the compressor module and are created off-line using vector quantization methods. Once the sub-vector have been recovered, a feature vector is generated by the grouping processor. Using the a priori assignments stored in a grouping table the sub-vectors are placed in the appropriate positions in the vector.

As embodied and broadly described herein the invention also provides an apparatus for compressing a speech signal, said apparatus including:

means for receiving said speech signal;

means for processing a frame of said signal to generate at least one feature vector, said feature vector including a plurality of elements describing a characteristic of said frame;

means for grouping elements of said feature vector into a plurality of sub-vectors, one sub-vector of said plurality of sub-vectors including at least one of said elements; and means for associating each sub-vector with an entry in a codebook, said entry being an approximation of the sub-vector.

As embodied and broadly described herein the invention also provides a machine readable storage medium including:

a codebook including a plurality of entries, each said entry being an approximation of a sub-vector of a feature vector, said feature vector including a plurality of elements describing a characteristic of a speech signal frame, at least one sub-vector including at least one of said elements;

a codebook entry index vector including a plurality of indices, each index constituting a pointer to said codebook permitting retrieval of a corresponding entry that constitutes an approximation of a sub-vector of a feature vector.

As embodied and broadly described herein, the invention also provides an apparatus for decompressing an audio signal, said apparatus comprising:

means for receiving a frame of an audio signal in a compressed format, said frame including a plurality of indices;

a codebook including a plurality of entries, each entry being associated with a given index;

means for extracting from said codebook entries corresponding to said indices;

means for separating at least one of said entries corresponding to said indices into individual elements of a feature vector that describes a characteristic of the audio signal As embodied and broadly described herein, the invention further provides a speech recognition apparatus, comprising:

a database repository containing a plurality of client dictionaries, each dictionary including a plurality of orthographies;

means for receiving a spoken utterance to be stored as an orthography in a selected one of said plurality of client dictionaries;

means for assessing a degree of confusability between said spoken utterance and orthographies in said selected one of said plurality of client dictionaries;

means for entering in said selected one of said plurality of client dictionaries an orthography representative of said spoken utterance if the degree of confusability between said spoken utterance and other orthographies in said selected one of said plurality of client dictionaries is below a certain level.

As embodied and broadly described herein, the invention also provides a method for compressing an audio signal, comprising:

processing said audio signal to generate at least one feature vector, said feature vector including a plurality of elements;

grouping elements of said feature vector into a plurality of sub-vectors; and quantizing said plurality of sub-vectors.

As embodied and broadly described herein the invention also provides a method for compressing a speech signal, said method comprising the steps of:

receiving said speech signal;

processing a frame of said signal to generate at least one feature vector, said feature vector including a plurality of elements describing a characteristic of said frame;

grouping elements of said feature vector into a plurality of sub-vectors, one sub-vector of said plurality of sub-vectors including at least one of said elements; and associating each sub-vector with an entry in a codebook, said entry being an approximation of the sub-vector.

BRIEF DESCRIPTION OF THE DRAWINGS

These and other features of the present invention will become apparent from the following detailed description considered in connection with the accompanying drawings. It is to be understood, however, that the drawings are designed for purposes of illustration only and not as a definition of the limits of the invention for which reference should be made to the appending claims.

DESCRIPTION OF A PREFERRED EMBODIMENT

Figure 1:
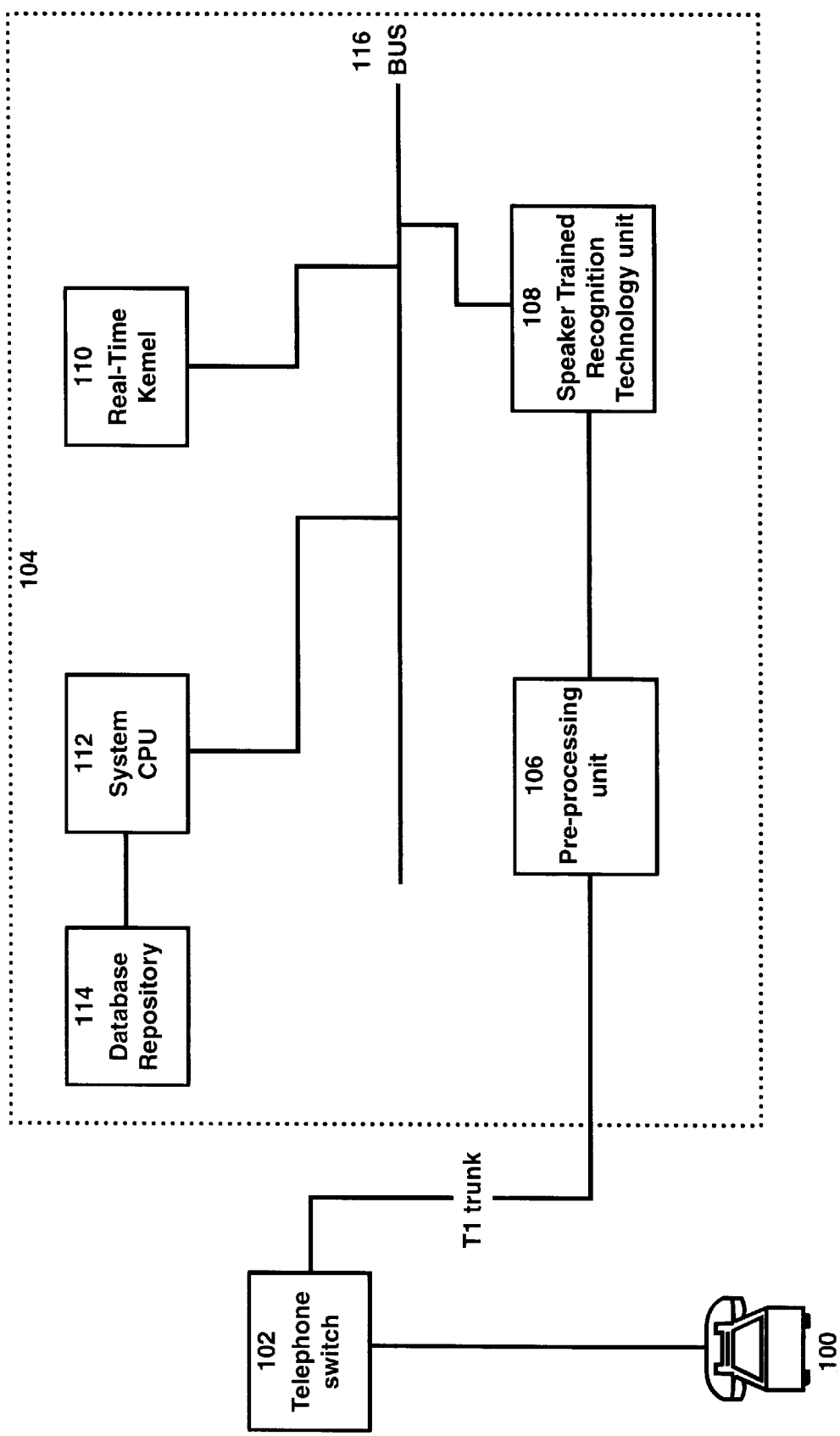
FIG. 1 shows a system in which the preferred embodiment of this invention operates.

In the preferred embodiment of this invention the speech recognition apparatus comprising the compression/decompression module is integrated into a telephone network of the type shown in FIG. 1 where it can be used for various services. In its preferred embodiment the apparatus is used to allow voice-activated dialing (VAD). The user of the system enters his requests using a device such as a microphone or telephone set 100 that converts the spoken utterance into an electric signal. The signal is then transmitted through a telephone switch 102 to a speech-processing centre 104. The speech processing centre 104 is composed of five (5) major blocks inter-connected through a bus 116 and a dedicated data channel 118. The five major blocks are the system CPU 112, the database repository 114, the real-time kernel 110, the pre-processing unit 106 and the Speaker-Trained recognition technology unit 108. The speech-processing centre 104 can function in one of two modes namely a training mode and in dialling mode. The speech-processing centre 104 functions in training mode when the user wishes to add new entries to his respective client dictionary and in dialling mode when the user wishes to dial a number.

SYSTEM OVERVIEW

Figure 5:
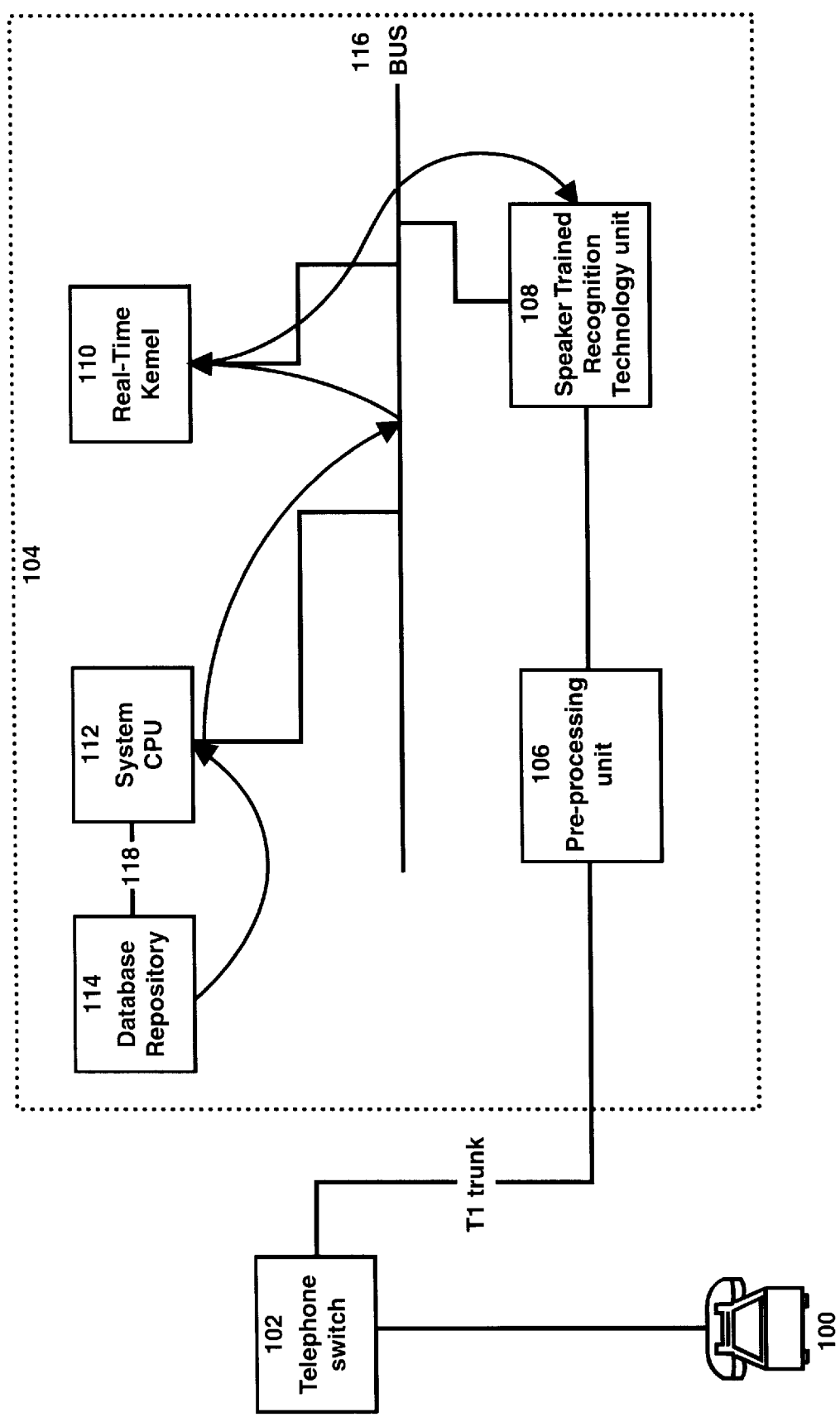
FIG. 5 the trajectory of a client dictionary being transferred to the Speaker Trained Recognition Technology unit.

In a typical training interaction, once the voice activated system receives a request from the user, it will first download from the database repository 114 the client dictionary associated with the user. The database repository 114 is a non-volatile memory unit where all the client dictionaries are stored. In the preferred embodiment of this invention, the telephone number of the subscriber indexes the client dictionaries in the database repository. Other indexing methods are possible such as indexing via a user code. The organisation and searching methods may vary across implementations and organisations and methods differing from those mentioned above do not deter from the spirit of the invention. Once the client dictionary is located, it is transferred to the Speaker Trained Recognition Technology unit. The transfer process is done through the system CPU 112 and the real-time kernel 110, to the Speaker Trained Recognition technology unit 108 as shown in FIG. 5. The system CPU 112 is the computer that executes computations The real-time kernel 110 can be any real time operating system kernel such as the Motorola PSOS.

As a second step the system will issue a prompt over the telephone network requesting the user to specify a name he wishes to add. When the speech-processing centre 104 first receives an utterance, the pre-processing unit 106 translates the incoming signal into a form that will facilitate speech recognition. The preferred embodiment of this invention uses a pre-processing unit that generates a sequence of feature parameters such as mel-based cepstral parameters. Feature parameters for one frame are then combined into what is commonly known as feature vectors. Feature vectors may be composed of any number of entries The preferred embodiment of this invention uses mel-based cepstral vectors each vector being composed of twenty-three (23) coefficients. The first eleven (11) elements of the feature vector, often referred to as the static parameters, are the cepstral coefficients $c_1, \ldots, c_{11}$. The remaining twelve (12) elements, often called dynamic parameters, are often designated as $\delta c_1, \ldots, \delta c_{11}$ and are estimated from the first derivative of each cepstral coefficient. In the preferred embodiment the cepstral coefficient $c_0$, which represents the total energy in a given frame, is not used except to compute the dynamic feature $\delta c_0$. The pre-processing operation and Mel-based cepstral parameters are well known in the art to which this invention pertains.

Figure 2A:
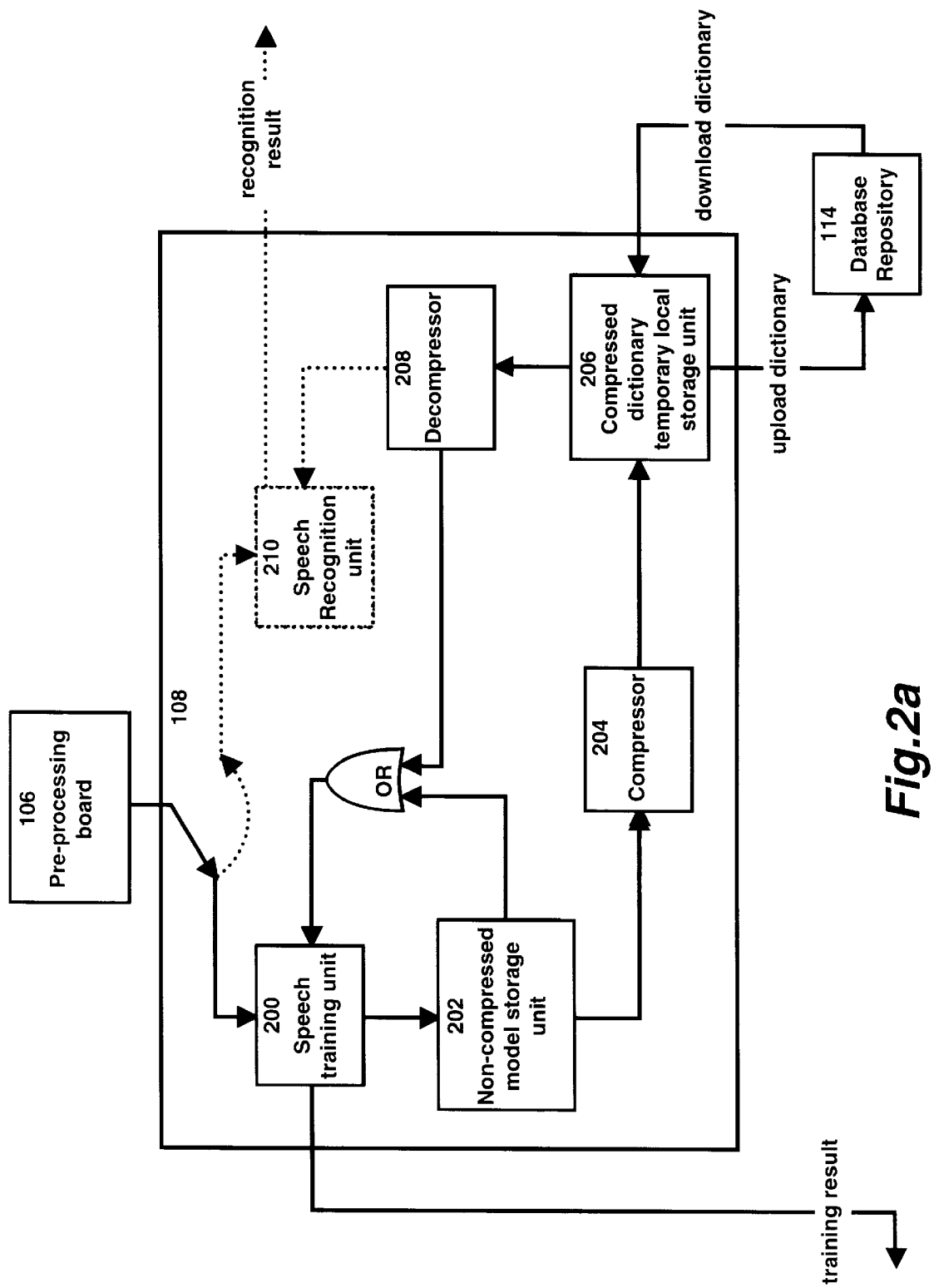
FIG. 2a shows a detailed block diagram of a Speaker Trained Recognition Technology unit in training mode that uses a preferred embodiment of the invention.
Figure 2B:
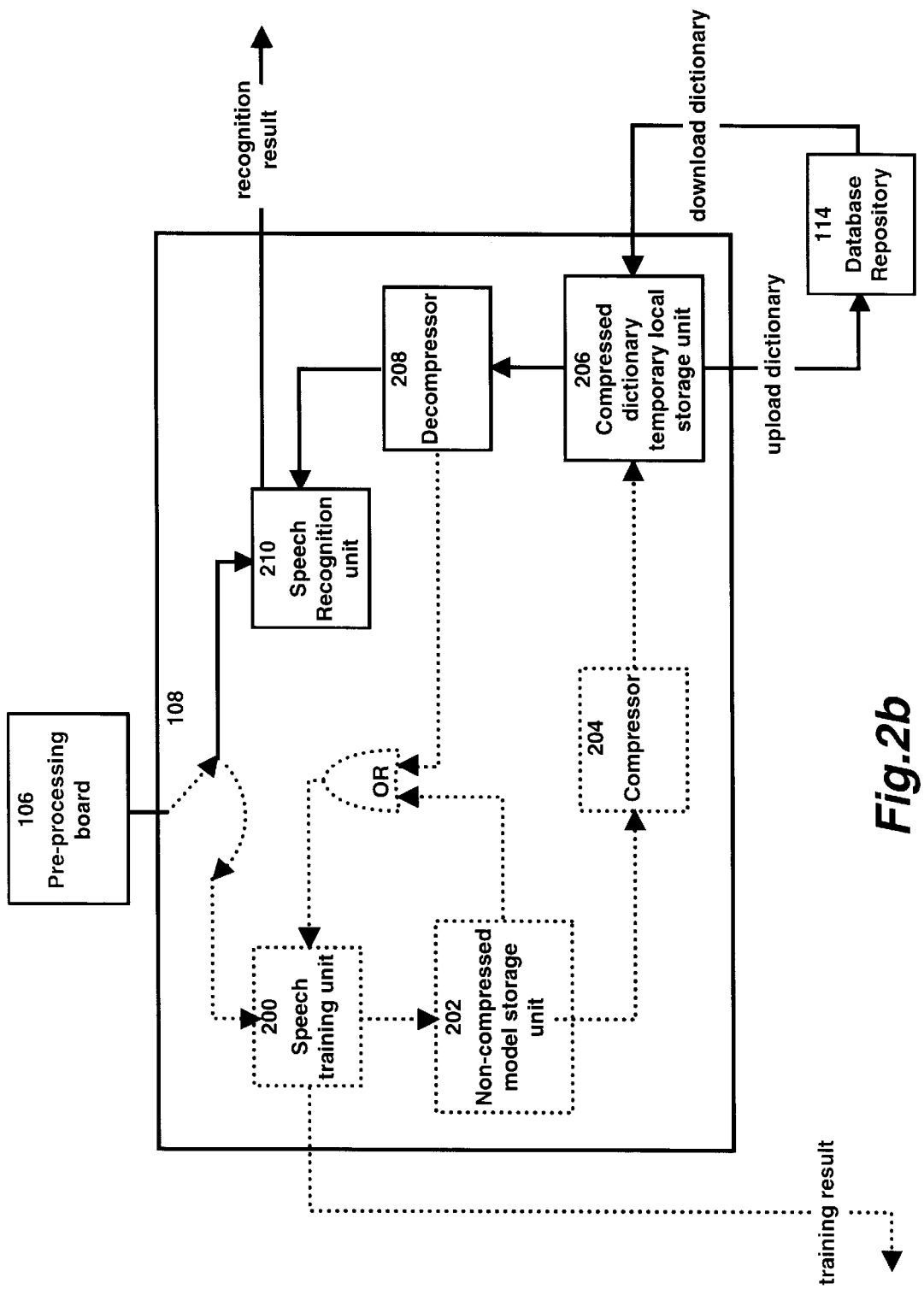
FIG. 2b shows a detailed block diagram of a Speaker Trained Recognition Technology unit in dialling mode that uses a preferred embodiment of the invention.

In the third processing step, the feature vectors are transferred to the Speaker Trained Recognition unit 108. The Speaker Trained Recognition technology unit 108 performs the detailed speech processing of the signal and is shown in FIG. 2a. In FIG. 2a, the blocks, denoted by dotted lines are inactive during the training mode and those denoted by continuous lines are active. The speech-training unit 200 receives the feature vectors generated by the pre-processing unit 106 and performs a series of tests between the newly entered utterance and each entry in the client dictionary. The client dictionary is stored in its compressed form in a temporary storage unit 206 herein referred to as quantizor codebook entry index vectors. This storage unit 206 is accessible by the database repository 114 to upload and download client dictionaries. The first test, designated as confusability testing, includes three parts Firstly, the decompression unit 208 processes each entry in the client dictionary and generates a series of feature vectors. In the preferred embodiment entries are processed one at the time. Each entry in the client dictionary is then scored in the speech-training unit 200 for similarity against the new entry. The preferred embodiment of this invention uses a fast-match algorithm. Once all the entries in the client dictionary have been scored, the best score is compared to a threshold indicating the level of confusability accepted. If the score exceeds this threshold, implying that there is an entry in the client dictionary very similar to the one being added, the system returns an error indicating the problem to the user. On the other hand if the score is below the threshold and no entry in the client dictionary is similar enough, the system requests the user to enter the same name a second time. Again the confusability test is performed with each entry in the client dictionary and the same threshold test is applied. This time, if the threshold is satisfied, a second test, herein referred to as the consistency test, is performed between the first input utterance and the second input utterance. The preferred embodiment of this invention uses a Dynamic Time Warping (DTW) computation here to compute the distance between the two utterances. If the comparison is successful, a model is created which is a combination of the two utterances again using DTW techniques to compute the distance between them. Dynamic Time Warping is well known in the field of speech processing. The reader is invited to consult speech recognition books such as "Discrete Time Processing of Speech Signals" by Deller & alse MacMillan publishing New York and O'Shawnessey D. (1990) "Speech Communication: Human and Machine", Addison-Wesley. Addison-Wesley series in Electrical Engineering: Digital Signal Processing, whose contents are hereby incorporated by reference. If the test is successful a model representing a Dynamic Time Warping average is created and placed in a temporary storage location 202. The model is another feature vector. Following this, the model is processed by the compressor unit 204 which generates a compressed version of the feature vector herein designated as a quantizor codebook entry index vector. Once the quantizor codebook entry index vectors have been generated for the utterance, they are added to the client dictionary 206 along with useful information such as a telephone number in the case of voice activated dialing. Once the user terminates his operation and hangs up, the client dictionary is uploaded to the database repository 114.

Compression Unit

Figure 3:
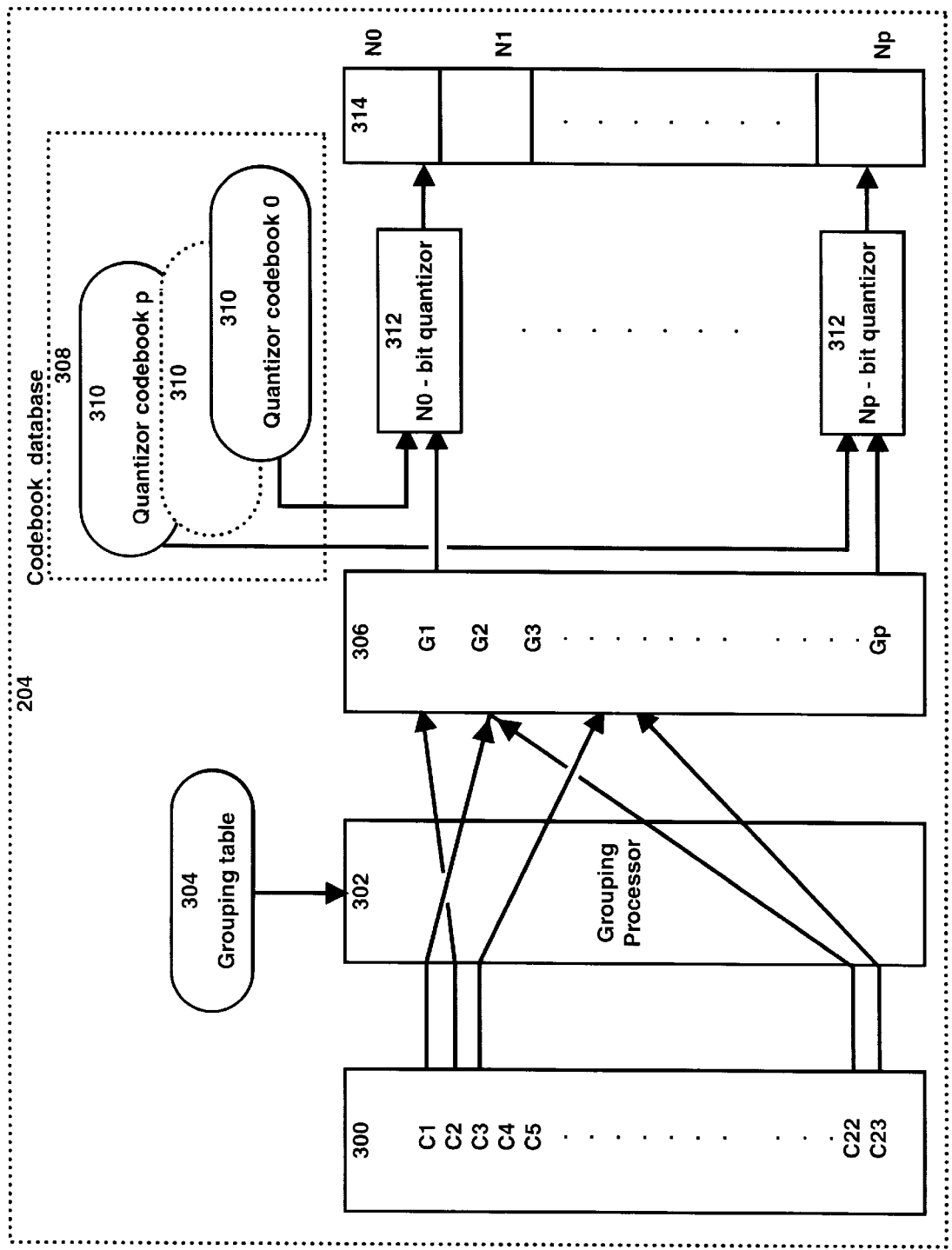
FIG. 3 shows a detailed block diagram of the compressor module consistent with the invention.

The compression unit 204 is shown in detail in FIG. 3. The basic approach of the compression unit is to group the 23-dimensional cepstral vector into a number of pre-defined sub-vectors of various sizes and encode them separately using a set of variable-bit quantizors which are optimized for these sub-vectors respectively. In the preferred embodiment of this invention the compressor module uses a two step vector quantization method. The input of this unit is the feature vector. The feature vector coefficients 300 are first grouped into sub-vectors 306 by a grouping processor 302. The sub-vectors are designated by $G_x$ where x in the sub-vector index. The sub-vectors compositions are defined by a priori assignments stored in a grouping table 304. These a priori assignments are defined by off-line iterative computations in order to form groups that maximize the accuracy of the system and are generated at the same time as the quantizor codebook database 308.

Secondly, each sub-vector is processed by a $N_k$-bit quantizor 312, Nk being the number of bits assigned to the kth sub-vector. Preferably, each quantizor is associated to a quantizor codebook 310 located in the quantizor codebook database 308. The codebooks can be created off-line using vector quantization methods. In a specific example, iterative clustering is performed on the sub-vectors assigned to a particular codebook. Essentially clustering involves selecting the best set of M codebook vectors based on L test vectors ($L \geq M$). The clustering procedure is well known in the field to which this invention pertains. More information about this topic can be found in "Fundamentals of speech Recognition" Prentice Hall publishing by L. Rabiner and B.-I. Guang (1993) p.122–132 whose content is hereby incorporated by reference. In the preferred embodiment, the codebooks were generated at the same time as the grouping table 304 and the method is described further on in the specification. Each codebook comprises a number of entries, herein designated as clusters, accessible via indices A quantizors 312 generates an index corresponding to an entry in a given codebook that is the most likely to match a given sub-vector. In order to find the best match in the cookbook, the following expression is used:

$$V_{kj} = \min |G_k - V_{km}| \qquad \text{Equation 1}$$

for all m in the codebook
where | | is a distance computation, k is the index of the sub-vector, m is the index of the entry in the codebook, v is the entry in the codebook, j is the codebook entry index of the nearest neighbor. This computation is performed for each sub-vector. The combination of the indices of the nearest codebook entries over the various sub-vectors forms the compressed version of the feature vector or quantizor codebook entry index vector 314.

Decompression Unit

Figure 4:
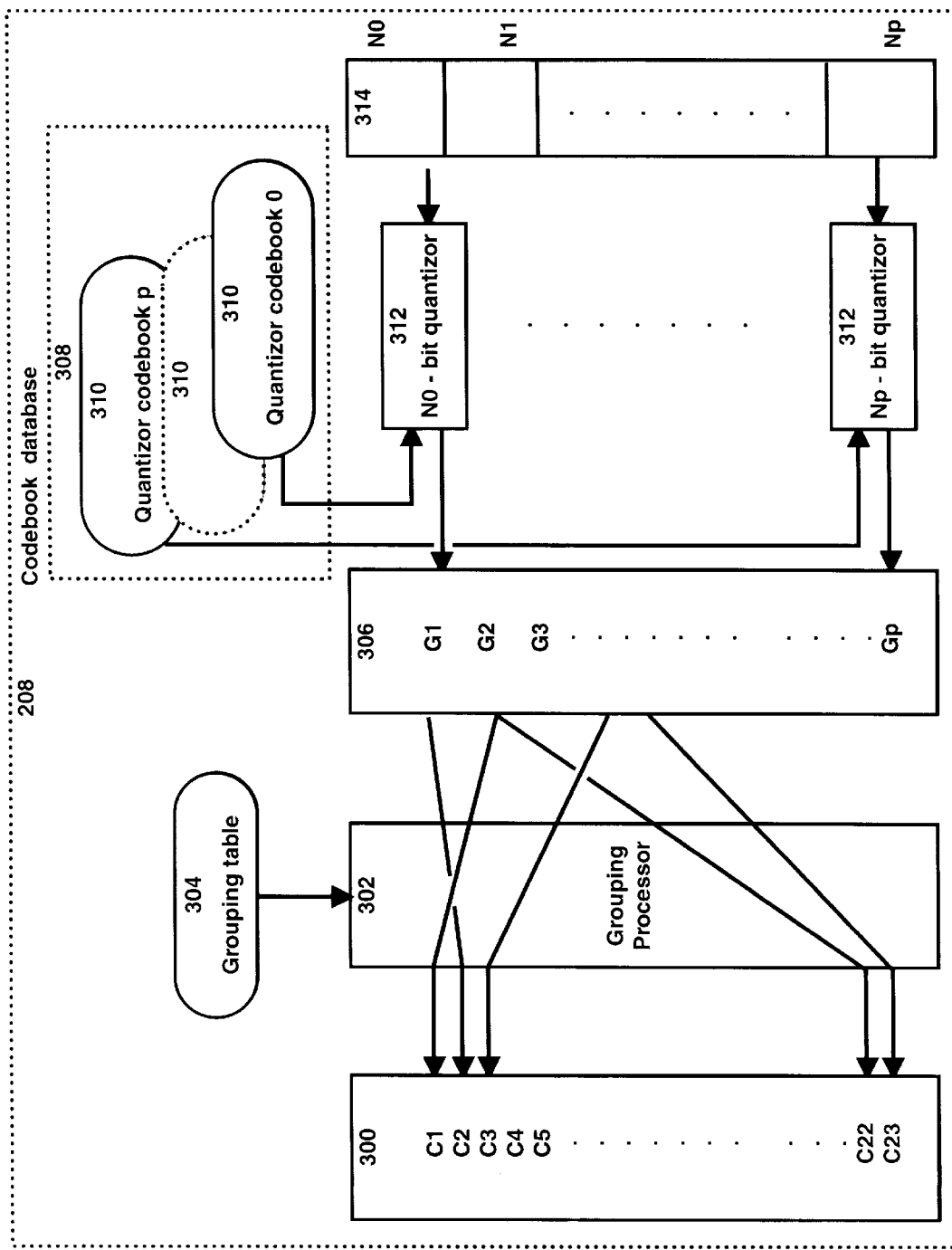
FIG. 4 shows a detailed block diagram of the decompressor module consistent with the invention.

The decompression unit is shown in detail in FIG. 4 In the preferred embodiment of this invention the decompression module uses a two step vector quantization method and uses components similar to that of the compression unit namely a grouping processor 302 a grouping table 304 and codebook database 308 and N-bit quantizors 312. The client dictionary entries are received by a temporary storage unit 314. As mentioned above, the client dictionary entries are stored in the form of quantizor codebook entry index vectors. The quantizor codebook entry index vectors are used to lookup in the codebook database 308 the associated quantizor codebook 310 to find the corresponding quantized coefficients This is a simple look-up/search operation and the manner in which the search is performed does not detract from the spirit of the invention. Preferably, the codebooks in the decompression module are the same as that of the compression module and are created off-line using vector quantization methods. The recovered quantized coefficients stored in 306 and then rearranged using the grouping processor 302 in order to recover a feature vector 300. The grouping processor 302 uses the a priori assignments stored in the grouping table to place the sub-vector entries in the appropriate positions in the feature vector 300.

Grouping table & Quantizor Codebook Generation

Figure 6:
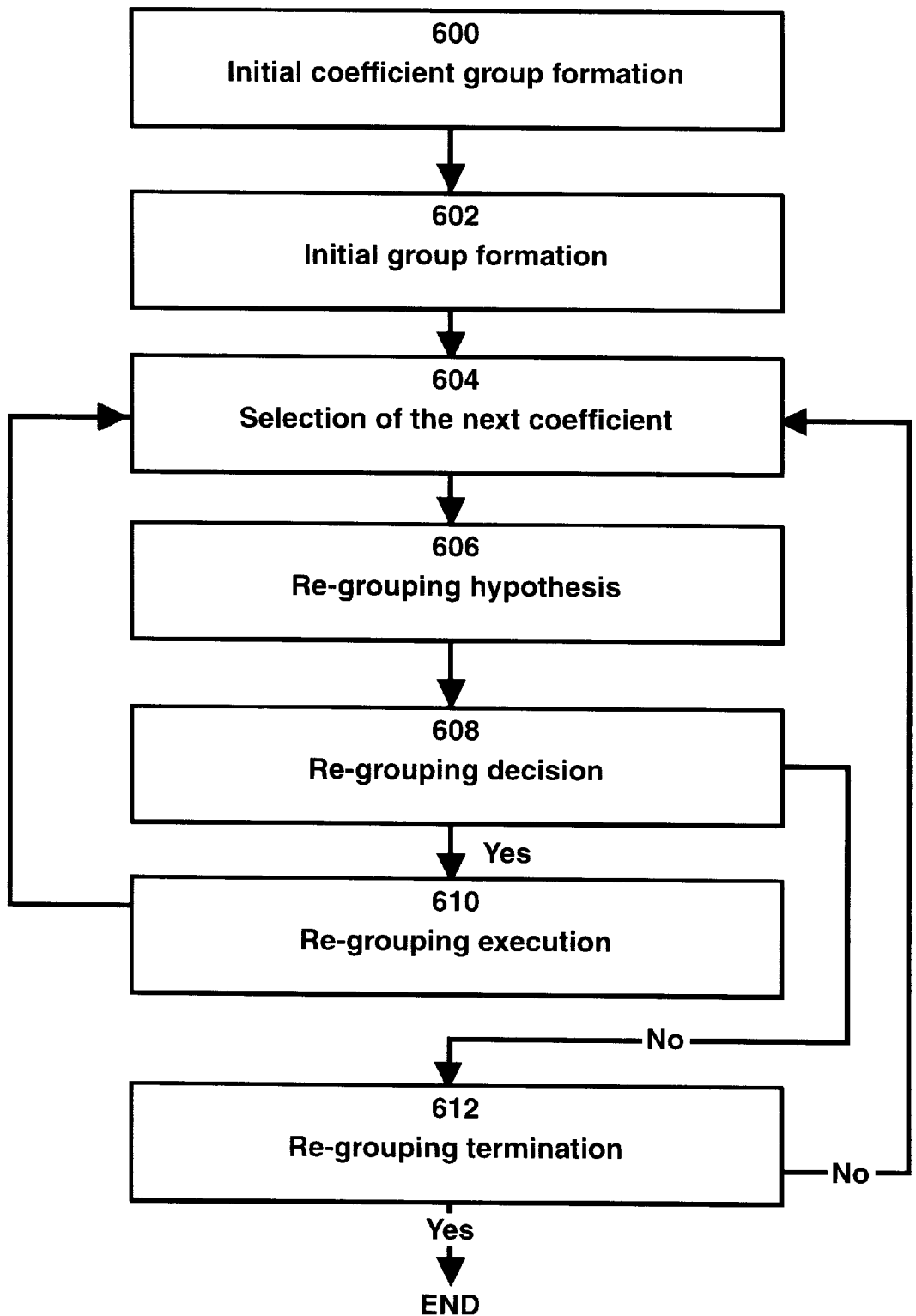
FIG. 6 shows a flow chart of the off-line grouping table and quantizor codebook generation.

In the preferred embodiment of this invention, the grouping table and quantizor codebooks are generated together such that their composition minimizes the distortion of the feature vector coefficients. The inputs to the generation of a priori assignments are the number of cepstral coefficients (23 in the preferred embodiment), a set of training cepstral vectors say M vectors, the number of sub-vectors to form and the total number of bits in the compressed vector, herein referred to as quantizor codebook entry index vector. The generation of the a priori assignments comprises two major phases namely an initial estimate and an iterative refinement. FIG. 6 shows a flow chart of the generation of the grouping table 304 and the codebook database 308. In the preferred embodiment the initial estimate step initializes the system to prepare for the iteration to follow. The first stage in this phase is the initial Coefficient Foration 600. In this stage, each coefficient defines a single-element group. Three operations are performed at this stage The first involves assigning a number of bits to each group/coefficient. This can be done using the following mathematical operation:

$$n_i = N_T \times \left[ \frac{SF[V_i]}{\sum_{k=1}^{23} SF[V_k]} \right] \quad i = 1, \ldots 23 \qquad \text{Equation 2}$$

where $N_T$ is the total number of bits in the compressed vector, $n_i$ is the number of bits assigned to the ith coefficient, $V_i$ is the variance of the ith coefficient and SF[ ] is a function to assign the relative importance of the ith cepstral coefficient in the recognition. The function SF[ ] could be a simple reciprocal function. For example:

$$SF[V_i] = \frac{1}{V_i} \qquad \text{Equation 3}$$

Therefore for coefficients with high variance values, less weight is assigned. The variance values are estimated from the M training vectors. Preferably a large number of training vectors are used in order to obtain a good representation of the spectra. Computing the variance of a variable is a well-known operation in the field to which the invention pertains The number of quantization codes of the ith coefficient is:

$$q_i = 2^{n_i} \; i=1, \ldots 23 \qquad \text{Equation 4}$$

The second operation involves generating a training set comprising the 1-D coefficient sub-vectors. For a training set comprising M feature vectors, the training set of 1-D coefficients is generated from the projection of the original vector space onto this coefficient and is defined as:

$$X_i = \{x_{1j}; 1 \leq j \leq m_i\} \; i=1, \ldots 23 \qquad \text{Equation 5}$$

where $X_i$ is the training set for the ith coefficient.

The third operation in the Initial Coefficient Group Formation step 600 involves the clustering of the sub-vectors and the distortion calculation. Algorithms such as the K-means algorithm and the isoda algorithm, two clustering algorithms, can be used here to create the optimal sub-groups. Clustering algorithms are well known in the art to which this invention pertains. A brief history and a detailed K-means, also known as the LBG algorithm, is given in Makhoul et al. "Vector quantization in speech coding," Proceedings of the I=EE, vol. 73, pp. 1551–1588, November 1985 whose content is hereby incorporated by reference The reader in also invited to consult Rabiner et al. (1979) "Applications of clustering techniques to speaker-trained isolated word recognition," Bell System Technical Journal, vol. 58, pp.2217–2231 whose content is hereby incorporated by reference. Many clustering Em algorithms can be used in the context of this invention and algorithms different from the ones mentioned above do not deter from the spirit of this invention. As was previously noted, each coefficient is assigned (based on equation 2) a certain number of bits ni permitting to define a certain number of codes $q_i$ (as defined in equation 4) Therefore it is necessary to cluster the training set entries Xi such that they comprise $q_i$ regions which are also known as clusters. In the clustering approach, the multiple entries obtained from the training vectors, M in this case, are reduced to $q_i \leq M$ clusters each cluster being represented by one feature vector. Mathematically this can be expressed as:

$$Z_i = \{z_{ij}; i \leq j \leq q_i\} \qquad \text{Equation 6}$$

where $z_{ij}$ is the centroid of the jth cluster of the ith coefficient The centroid can be generated with the K-mean algorithm mentioned above. The quantization distortion can be expressed as:

$$d_i = \sum_{j=1}^{q_i} \sum_{x \in x_{ij}^z} D(x, z_{ij}) \qquad \text{Equation 7}$$

where $X_{ij}^z$ is the set of all samples which belong to cluster $Z_{ij}$ and D( ) is a distance computation for example the euclidean distance.

The second step in the generation of the grouping table is referred to as the Initial group formation 602. In this step the coefficients the cepstral coefficients are split into p equal size groups. If the groups cannot be of equal size then either the remaining coefficients are added to one of the groups or the remaining coefficients are put in their own smaller group. The preferred embodiment of this invention leaves the remaining coefficients in their own group. For each of these groups the same sequence of three operations is performed with the modification that the operations are performed on multi-dimensional vectors instead of one-dimensional vectors. The first operation on these p groups involves assigning a number of bits to each group. This can be done using the following mathematical operation:

$$N_k = \sum_j n_{kj} \; k = 1, \ldots p \qquad \text{Equation 8}$$

where $N_k$ is the number of bits assigned to the kth sub-vector, k is the index of the sub-vector, p is the number of sub-vectors and i is the index of the coefficient within a given sub-vector. The number of quantization codes of the kth sub-vector is:

$$Q_k = 2^{N_k} \; k=1, \ldots p \qquad \text{Equation 9}$$

The second operation involves generating a training set comprising the multidimentional sub-vectors. Again the training set is generated from the projection of the original vector space onto the sub-vector space.

The third operation in the Initial Group Formation step 602 involves the clustering of the sub-vectors and the distortion calculation. Here the same clustering algorithms as for the previous initial coefficient group formation step 600 can be used. Mathematically this can be expressed as:

$$Z_k = \{z_{kj}; 1 \leq j \leq O_k\} \; K=1, \ldots, p \qquad \text{Equation 10}$$

where $z_{kj}$ is the centroid of the jth cluster of the kth sub-vector. The centroid can be generated with the K-mean algorithm mentioned above. The quantization distortion can be expressed as:

$$D_k = \sum_{j=1}^{Q_k} \sum_{x \in x_{kj}^z} D(x, z_{kj}) \qquad \text{Equation 11}$$

where $x_{kj}^z$ is the set of all samples which belong to cluster $z_{kj}$ and D( ) is a distance computation for example the euclidean distance The third step in the generation of the grouping table involves selecting the next coefficient 604 for the re-grouping process. Any method may be used to choose the next coefficient such as random choice, round-robin and others The preferred embodiment of this invention uses the round-robin selection method.

The following step involves generating a series of hypothesis 606 for rearranging the groups. The idea is to choose the arrangement that minimizes the quantization distortion $D_k$ for each group. Two possibilities may occur when you rearrange groups namely you move a coefficient to another group, herein referred to as coefficient migration, or you exchange coefficients between groups, herein referred to as coefficient exchange. The main task in this process is to compute the clustering distortions for both the source group and all destination group candidates under coefficient migration as well as under an exchange. The change that provides the best distortion reduction is then chosen. Within the process, the time used to cluster the source group and the (p−1) destination groups under coefficient migration and (p−1) source and (p−1) destination groups under coefficient exchange is large even for small values of p. Preferably, in order to reduce the computations, only a rough computation is performed on all the groups followed by the actual clustering and distortion computations only for a small number of candidates for which the best distortion reduction was obtained by the rough calculation. In the preferred embodiment this computation is performed on the top 10% of the candidates. The computations are done using the coefficient selected in step 604.

Figure 7:
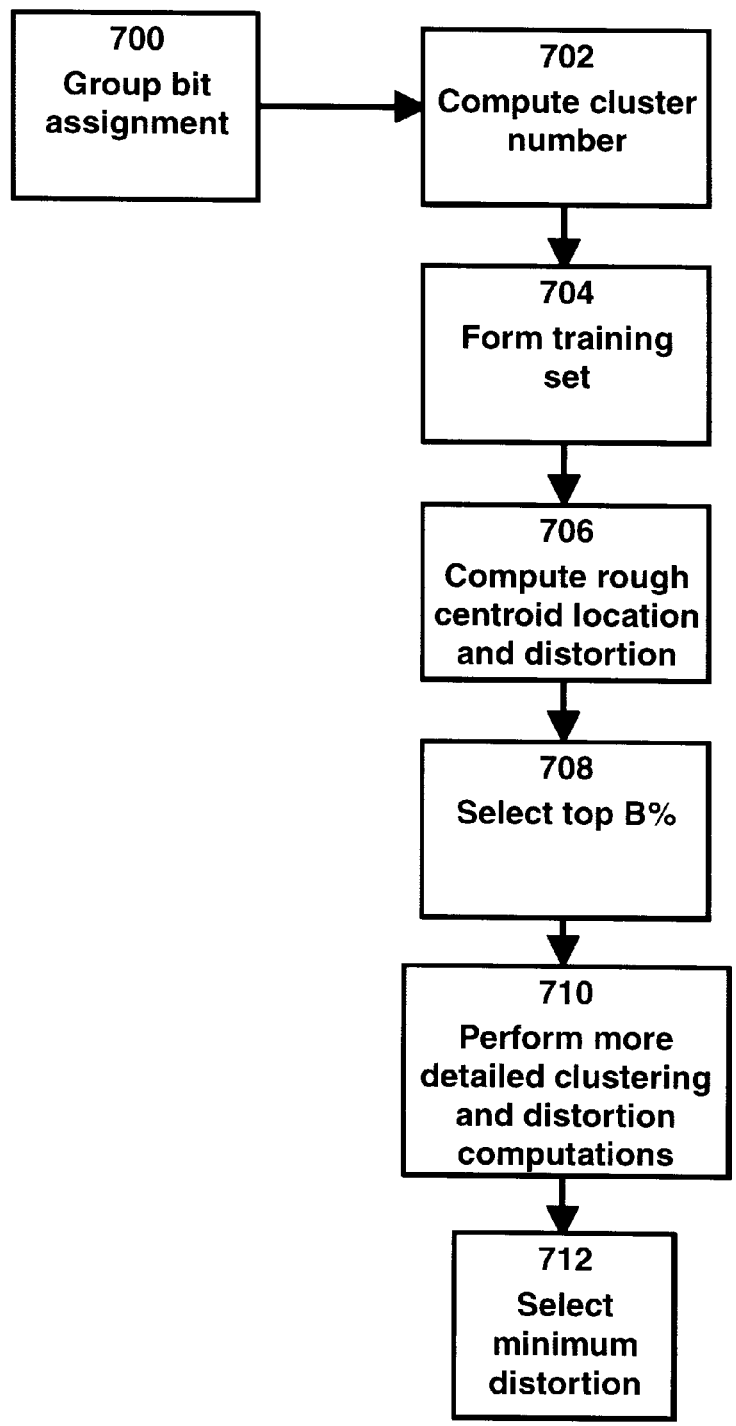
FIG. 7 shows is a flow chart showing the sequence of operations to generate hypothesis to re-group the sub-vectors.

Each computation involves the same series of operations shown in FIG. 7. These computations are performed once under coefficient exchange and another time under coefficient migration preferably for all the possibilities. The first step 700 is computing the number of bits remaining/added in a given group after each reordering. The second step 702 involves computing the number of clusters remaining/added in a given group. For a migration the first two computations are:

$$N_{source}^{migration} = N_{source} - n_i$$
$$N_{destination}^{migration} = N_{destination} + n_i$$

Equation 12

$$Q_{source}^{migration} = 2^{N_{source}^{migration}} \quad Q_{destination}^{migration} = 2^{N_{destination}^{migration}}$$

Equation 13 where i is the index of the coefficient chosen at step 604 and source/destination are the indices of the source and destination groups respectively The second re-ordering possibility is to exchange two coefficients. In this case the computations are:

$$N_{source}^{exchange} = N_{source} - n_i + n_l$$
$$N_{destination}^{exchange} = N_{destination} + n_i - n_l$$

Equation 14

$$Q_{source}^{exchange} = 2^{N_{source}^{exchange}} \quad Q_{destination}^{exchange} = 2^{N_{destination}^{exchange}}$$

Equation 15 where i is the index of the coefficient chosen at step 604, source/destination are the indices of the source and destination groups respectively and 1 is the index of the coefficient chosen from any group which the coefficient with index i is not part of.

The third step 704 involves operation involves generating a training set comprising a multi-dimensional sub-vectors based on the new coefficient composition. Following this 706 a rough computation of the centroid and distortion is done for each source and destination group and the same operations apply for both migration and exchange. As previously described this rough computation is done in order to speed up the process. In the preferred embodiment this is done by taking the cross product of the set of 1-D clusters of all the cepstral coefficients in each group This is defined as:

$$Z_{source}^{rough} = \left\{ \prod_{j \in G_{source}} Z_j \right\}$$
$$= \{z_{source,k}^{rough}; \ 1 \leq k \leq Q_{source}\}$$

$$Z_{destination}^{rough} = \left\{ \prod_{j \in G_{destination}} Z_j \right\}$$
$$= \{z_{destination,k}^{rough}; \ 1 \leq k \leq Q_{destination}\}$$

Equation 16 and the corresponding equations for distortion are:

$$D_{source}^{rough} = \sum_{j=1}^{Q_{source}} \sum_{x \in x_{source,i}} D_z(x, z_{source,j}^{rough})$$

$$D_{destination}^{rough} = \sum_{j=1}^{Q_{destination}} \sum_{x \in x_{destination,i}} D_x(x, z_{destination,j}^{rough})$$

Equation 17

Figure 8A:
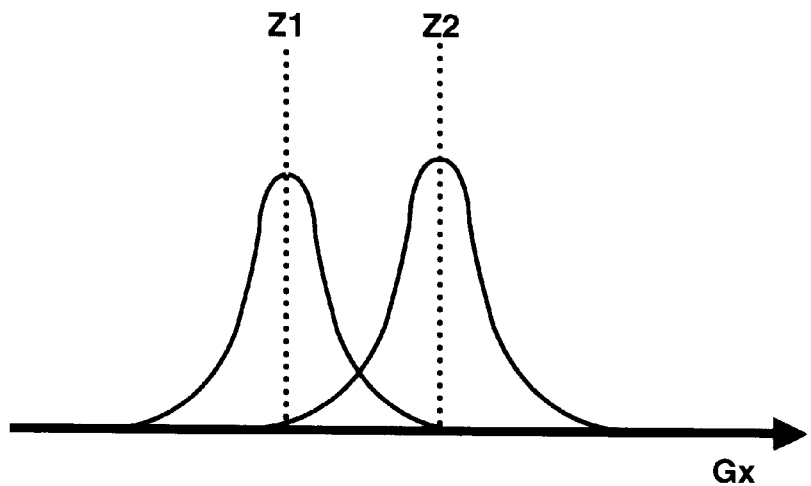
FIG. 8a and 8b show a the distribution and centroid location of coefficients.
Figure 8B:
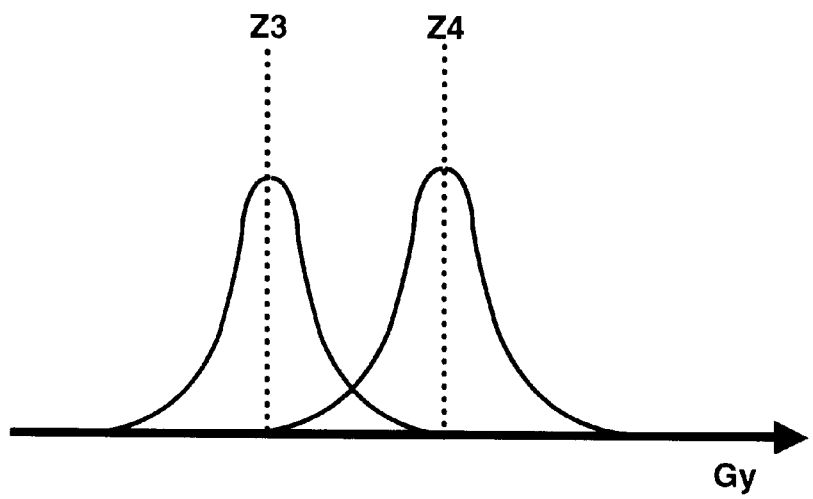
Figure 9:
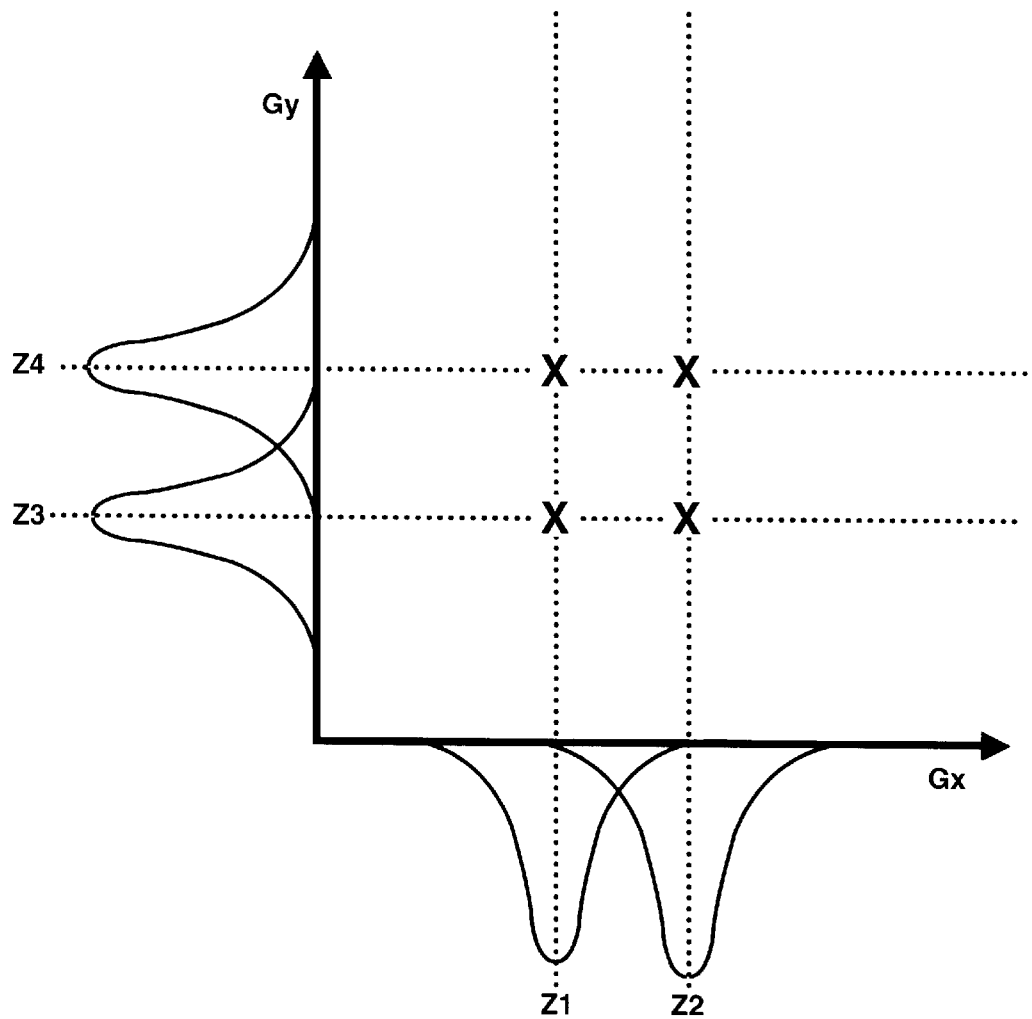
FIG. 9 shows the centroid location obtained by combining two groups using a rough computation.

In the above equations, source/destination are the indices of the source and destination groups respectively and $Z_x^{rough}$ are the rough estimates of the centroids of the clusters. The following example will describe this computation Let us say we have two coefficient groups say $G_x$ and $G_y$ defined by two clusters each Their distribution may look like that shown in FIGS. 8a and 8b with centroids at $Z_1$, $Z_2$ for $G_x$ and $Z_3$, $Z_4$ for $G_y$. When combining $G_x$ and $G_y$ we find the intersection of the two spaces as shown in FIG. 9. The intersections are taken to be the most likely location of the centroid of the new grouping. The distortion is then computed by taking all the closest neighbors to the centroid and computing the distance.

Once the above computations have been performed for all possibilities, the fourth step 708 involves selecting the top B % candidate, which have the lowest rough distortion value, and on which the clustering and distortion computations 710 are performed using more exact computations such as the K-means algorithm.

The grouping which reduces the distortion the most is then selected as a candidate 712 In the preferred embodiment, two candidates are selected, one for a migration and one for an exchange The distortion for these grouping hypothesis for the source and destination group are designated as $D_{source}^{exchange}$, $D_{destination}^{exchange}$, $D_{source}^{migration}$ and $D_{destination}^{migration}$.

Following this, based on the hypothesis generated at step 606, a re-ordering decision is made 608. Essentially the procedure involves evaluating if performing a change will result in reducing further the distortion or if an optimum level has been reach. In the first case, step 610 is executed by choosing the hypothesis that reduces the distortion best The new clusters are then entered into the quantizor codebook associated with each group involved in the re-grouping namely the source and destination groups. The preferred embodiment of this invention computes the benefit of exchange and migration using the following equations:

$$\Delta D_{source}^{migration} = [D_{source}^{migration} - D_{source}] - $$
$$[D_{destination}^{migration} - D_{destination}]$$
$$\Delta D_{source}^{exchange} = [D_{source}^{exchange} - D_{source}] - $$
$$[D_{destination}^{exchange} - D_{destination}]$$

Equation 18

The decision is then divided into four possible cases summarised in the table below.

| | | | |
|---|---|---|---|
| CASE A | $\left(\Delta D_{source}^{migration} < 0\right)$ AND $\left(\Delta D_{source}^{exchange} \geq 0\right)$ | Migration | |
| CASE B | $\left(\Delta D_{source}^{migration} \geq 0\right)$ AND $\left(\Delta D_{source}^{exchange} < 0\right)$ | Exchange | |
| CASE C | $\left(\Delta D_{source}^{migration} < 0\right)$ AND $\left(\Delta D_{source}^{exchange} < 0\right)$ | If $a \times \Delta D_{source}^{migration} < \Delta D_{source}^{exchange}$ Migration Else Exchange | |
| CASE D | Else | No re-grouping | |

The bias factor "a" (a>1) in case C is used to favor the exchange regrouping over the migration in order to maintain uniformity in the number of coefficients among the groups.

The re-grouping is terminated 612 where no regrouping is encountered for each and everyone of the coefficients or when a pre-defined number of reformation iterations is reached. At the end of the iteration, optimal grouping table and the individual sub-vector quantization codebooks are output for usage in the compression and decompression units.

I claim:

1. An apparatus for generating data indicative of a grouping scheme, said data indicative of a grouping scheme being suitable for use in compressing feature vectors, said apparatus comprising:

an input for receiving a plurality of feature vectors representative of audio information, each of said feature vectors including a plurality of discrete elements;

means for processing said plurality of feature vectors to generate corresponding sets of sub-vectors, said processing means including means for iteratively altering an order of grouping of discrete elements of at least one feature vector into the corresponding sets of sub-vectors until a pre-determined condition is reached, said order of grouping being altered at least in part on a basis of a distortion measurement on the discrete elements in the set of sub-vectors;

an output for outputting data indicative of a grouping scheme, said grouping scheme being derived at least in part on the basis of the order of grouping of discrete elements when the pre-determined condition is reached.

2. An apparatus as defined in claim 1, wherein said predetermined condition arises when a predetermined number of iterations have been effected.

3. A machine readable storage medium including a program element for use by a computing apparatus for generating a plurality of codebooks and a grouping scheme, the computing apparatus comprising:

first memory means comprising a plurality of data items representative of a plurality of audio frames;

a second memory means for storing a plurality of codebooks;

a third memory means for storing a grouping table;

processing means comprising means for:

a) processing said plurality of audio frames in order to derive a plurality of feature vectors, each of said plurality of feature vectors being associated to respective ones of said plurality of audio frames, each of said feature vectors including a plurality of elements, said elements describing a characteristic of a given audio frame;

b) grouping the elements of said feature vectors into initial sub-vectors, the composition of the initial sub-vectors being predetermined;

c) iteratively re-grouping elements of the sub-vectors and generating the codebooks associated to the sub-vectors until a pre-determined condition is reached, said regrouping being effected at least in part on a basis of a distortion measurement, said grouping scheme being derived at least in part on the basis of the order of grouping of said elements when the pre-determined condition is reached.

4. A machine readable storage medium as defined in claim 3, wherein said pre-determined condition arises when a predetermined number of iterations has been effected.

5. An apparatus for compressing an audio signal, said apparatus comprising:

an input for receiving an audio signal derived from a spoken utterance, said audio signal being separable into a plurality of successive frames;

a processing unit for processing a frame of said audio signal to generate a feature vector, said feature vector including a plurality of discrete elements characterizing at least in part the portion of the audio signal encompassed by the frame, said elements being organized in a certain sequence, said feature vector being suitable for processing by a speech recognition processing unit;

a compressing unit comprising:

a) a grouping processor for grouping elements of said feature vector into a plurality of sub-vectors on the basis of a certain grouping scheme, originally developed by iterative regrouping of sub-vectors based on at least a distortion measurement, at least one of the sub-vectors including a plurality of elements from said feature vector, said plurality of elements being out of sequence relative to said certain sequence;

b) a quantizer for quantizing the plurality of sub-vectors.

6. An apparatus as defined in claim 5, wherein said compressor includes a grouping table indicative of an order of association for elements of said feature vector from said certain sequence to form said plurality of sub-vectors, said order of association defining the certain grouping scheme.

7. An apparatus as defined in claim 6, wherein at least two of said plurality of sub-vectors comprise a different number of elements.

8. An apparatus as defined in claim 5, wherein said quantizer includes a codebook containing a set of entries, said entries being either exact matches of values that a sub-vector can acquire or approximations of the values that a sub-vector can acquire, said codebook further including a set of indices associated with respective entries.

9. An apparatus as defined in claim 8, wherein said quantizer comprises a plurality of codebooks, each codebook being associated with a given sub-vector to allow quantization of said given sub-vector.

10. An apparatus as defined in claim 9, wherein said quantizer is operative to process a sub-vector characterized by a certain value and entries in the codebook associated with the sub-vector to identify the entry that best matches the certain value, and output the index associated with the entry that best matches the certain value.

11. An apparatus as defined in claim 10, wherein said quantizer performs similarity measurements to identify the entry that best matches the certain value.

12. An apparatus for decompressing an audio signal, said apparatus comprising:

an input for receiving a frame of an audio signal in a compressed format, said frame including a plurality of indices;

a plurality of codebooks, each codebook being associated with a certain index of said frame, each codebook mapping index values to respective entries in said codebook, said entries being indicative of sub-vector values, said sub-vector values being indicative of feature vector elements in a certain sequence;

a first processing unit for extracting from said plurality of codebooks a set of entries corresponding to said plurality of indices of said frame;

a second processing unit for separating said sub-vector values into individual feature vector elements on the basis of an ungrouping scheme insert inverting a grouping scheme originally developed by iterative regrouping of sub-vectors based on at least a distortion measurement, such that the feature vector elements of a resulting feature vector are out-of-sequence relative to said certain sequence, said feature vector being suitable for processing by a speech recognition processing unit.

13. A method for compressing an audio signal, said method comprising the steps of:

receiving an audio signal derived from a spoken utterance, said audio signal being separable into a plurality of successive frames;

processing a frame of said audio signal to generate a feature vector, said feature vector including a plurality of discrete elements characterizing at least in part the portion of the audio signal encompassed by the frame, said elements being organized in a certain sequence, said feature vector being suitable for processing by a speech recognition processing unit;

grouping elements of said feature vector into a plurality of sub-vectors on the basis of a certain grouping scheme, originally developed by iterative regrouping of sub-vectors based on at least a distortion measurement, at least one of the sub-vectors including a plurality of elements from said feature vector said plurality of elements being out of sequence relative to said certain sequence;

quantizing the plurality of sub-vectors.

14. A method as defined in claim 13, further comprising the step of providing a grouping table indicative of an order of association for elements of said feature vector from said certain sequence to form said plurality of sub-vectors, said order of association defining the certain grouping scheme.

15. A method as defined in claim 14, wherein at least two of said plurality of sub-vectors comprise a different number of elements.

16. A method as defined in claim 13, further comprising the step of providing a codebook containing a set of entries, the entries being either exact matches of values that a sub-vector can acquire or approximations of the values that a sub-vector can acquire, said codebook further including a set of indices associated with respective entries.

17. A method as defined in claim 16, further comprising the step of providing a plurality of codebooks, each codebook being associated with a given sub-vector to allow quantization of said given sub-vector.

18. A method as defined in claim 17, wherein said quantizing step comprises the step of:

processing a sub-vector characterized by a certain value and entries in the codebook associated with the sub-vector to identify the entry that best matches the certain value;

outputting the index associated with the entry that best matches the certain value.

19. A method as defined in claim 18, wherein said processing step performs similarity measurements to identify the entry that best matches the certain value.

20. A computer readable storage medium including a program element for processing by a computer apparatus including a processor and a memory for implementing an apparatus for compressing an audio signal derived from a spoken utterance, said audio signal being separable into a plurality of successive frames, said program element implementing functional blocks including:

a processing unit for processing a frame of said audio signal to generate a feature vector, said feature vector including a plurality of discrete elements characterizing at least in part the portion of the audio signal encompassed by the frame, said elements being organized in a certain sequence, said feature vector being suitable for processing b a speech recognition processing unit;

a compressor unit comprising:

a) a grouping unit for grouping elements of said feature vector into a plurality of sub-vectors on the basis of a certain grouping scheme, originally developed by iterative regrouping of sub-vectors based on at least a distortion measurement, at least one of the sub-vectors including a plurality of elements from said feature vector, said plurality of elements being out of sequence relative to said certain sequence;

b) a quantizer for quantizing the plurality of sub-vectors.

21. A computer readable storage medium as defined in claim 20, wherein said compressor unit includes a first memory unit containing a grouping table indicative of an order of association for elements of said feature vector from said certain sequence to form said plurality of sub-vectors, said order of association defining the certain grouping scheme.

22. A computer readable storage medium as defined in claim 21, wherein at least two of said plurality of sub-vectors comprise a different number of elements.

23. A computer readable storage medium as defined in claim 20, wherein said quantizer includes a second memory unit containing a codebook containing a set of entries, said entries being either exact matches of values that a sub-vector can acquire or approximations of the values that a sub-vector can acquire, said codebook further including a set of indices associated with respective entries.

24. A computer readable storage medium as defined in claim 23, wherein said quantizer comprises a second memory containing a plurality of codebooks, each codebook being associated with a given sub-vector to allow quantization of said given sub-vector.

25. A computer readable storage medium as defined in claim 24, wherein said quantizer is operative to process a sub-vector characterized by a certain value and entries in the codebook associated with the sub-vector to identify the entry that best matches the certain value, and output the index associated with the entry that best matches the certain value.

26. A computer readable storage medium as defined in claim 25, wherein said quantizer performs similarity measurements to identify the entry that best matches the certain value.

* * * * *